July 22, 1947.     H. A. TOULMIN, JR     2,424,261
APPARATUS FOR COATING METALS
Filed Sept. 11, 1942     2 Sheets-Sheet 1
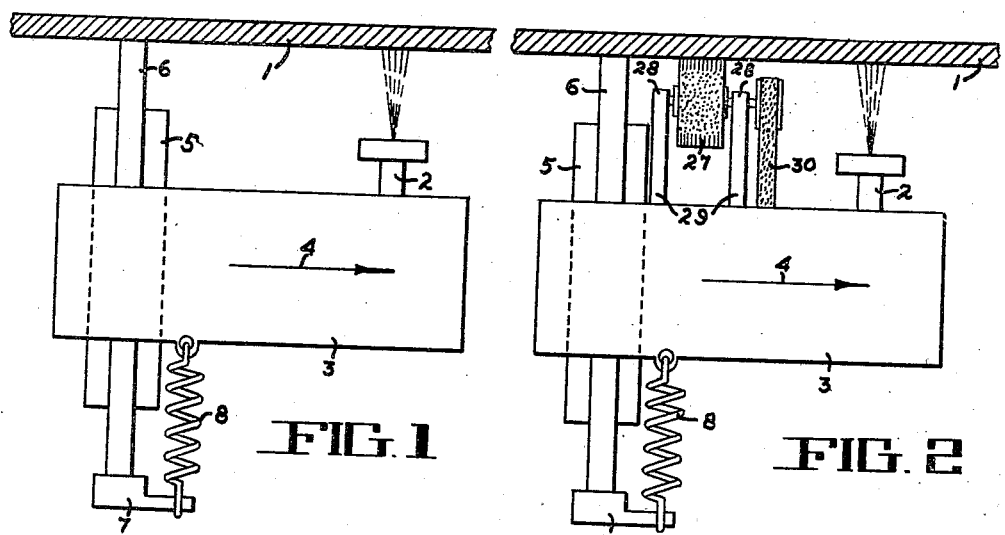
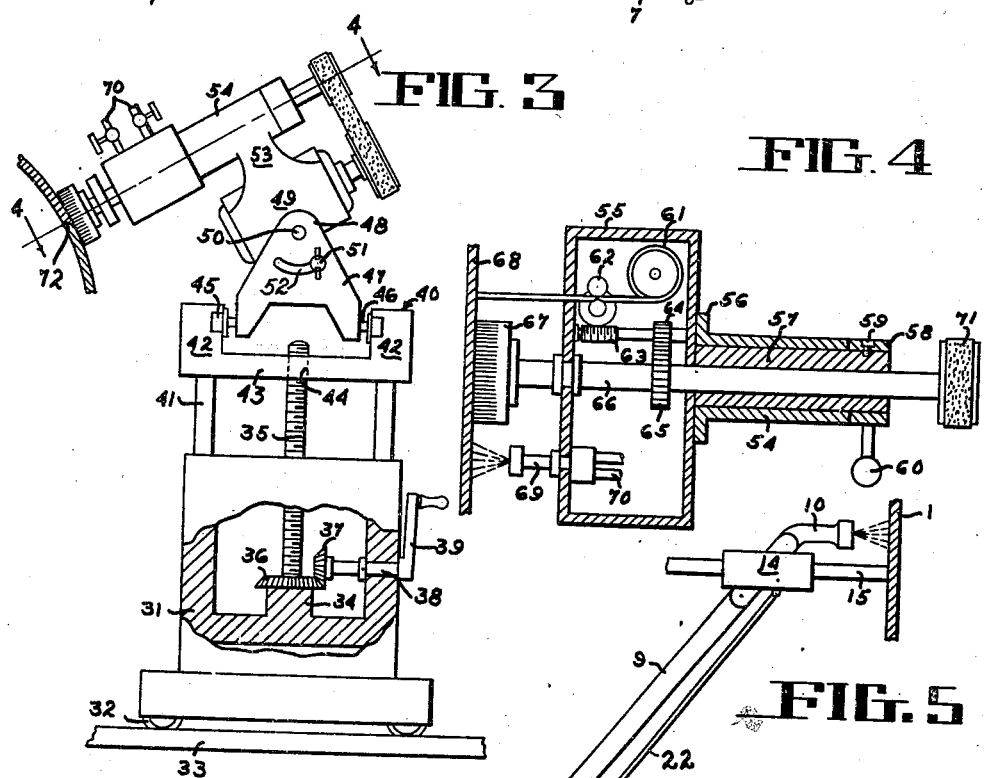
INVENTOR
HARRY A. TOULMIN JR.
BY
ATTORNEY

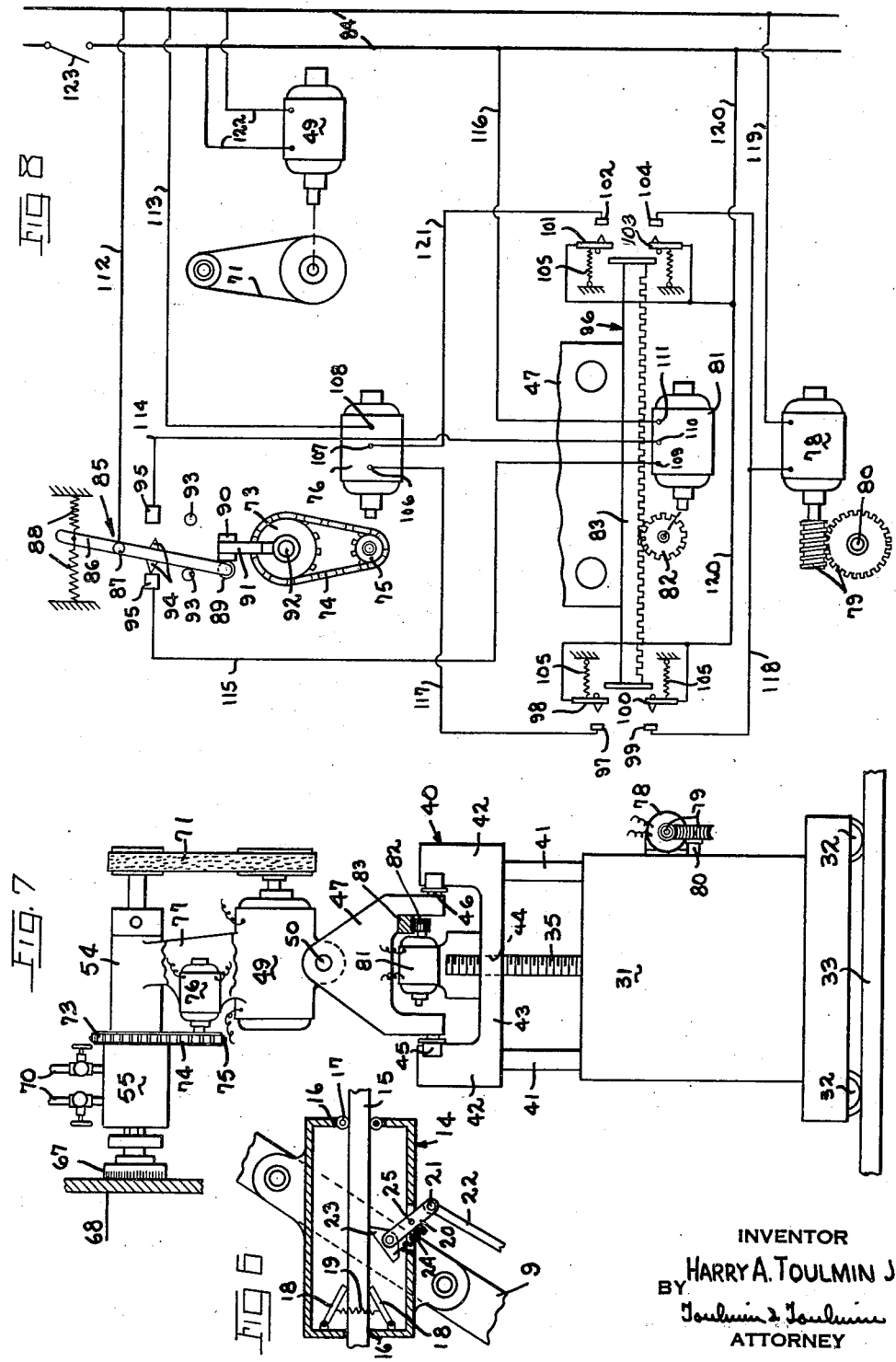

Patented July 22, 1947

2,424,261

UNITED STATES PATENT OFFICE 2,424,261

APPARATUS FOR COATING METALS

Harry A. Toulmin, Jr., Dayton, Ohio, assignor, by mesne assignments, to Chemical Developments Corporation, Dayton, Ohio, a corporation of Ohio Application September 11, 1942, Serial No. 458,025

7 Claims. (Cl. 91—12.1)

1

The present invention relates to coating metal parts with protective materials.

It is often desirable to lay down a rust-resistant or other protective coating on a base metal. Such a condition might arise, for example, in the case of huge iron tanks which are placed out of doors and serve as reservoirs for liquids. Still other places where such an operation may be desirable is in the fabrication of metal plates for ships and in which the plates are subjected to the abrasive and corrosive action of sea water, particularly when traveling at considerable speed. Various ways have been proposed to accomplish the metal coating operation and these have in general been satisfactory except in the case of large extensive surfaces. Some of the difficulties encountered are exemplified by the operation of galvanizing a base metal and utilizing the hot dip method. In such a case it is necessary to provide a dipping tank sufficiently large to accommodate the entire metal piece, and in the case of large metal plates, the cost of such tanks may be prohibitive. The same objection would apply to the electrolytic method of depositing metal on metal plates because the later must be entirely emersed in an electrolyte which is contained in a tank.

Moreover, in the case of a repair job, it is probable that the object to be coated is located at a considerable distance from any shop which might provide a dipping tank and even if the tank were available it is also possible that the object would be so heavy as to make it impractical to hoist the object and place the same into the tank.

The primary object of the invention is to provide improved apparatus and methods for coating large extensive surfaces with a metal layer of any desired thickness and over any size of surface. Another object is to provide an instrumentality which can be normally operated and employed to coat or recoat a metal surface which may form part of a large metal object.

Still another object is to provide an automatic machine which is capable of laying down a metal layer as a continuous operation without the necessity for any manual handling of the member to be coated other than placing the member in position.

A further object is to provide a machine which is adapted to apply or reapply a metal coating to a base metal surface, as when its original galvanize coating has been knocked off in spots and even when the surface or surfaces to be coated are somewhat inaccessible.

2

The invention will be better understood when reference is made to the following description read in connection with the accompanying drawings.

In the drawings:

Figure 1 shows the essential parts of the improved machine in diagrammatic form.

Figure 2 is a view similar to Figure 1 but includes a brush accessory to clean the heated surface.

Figure 3 is an end elevational view of a modified form of the machine employing various kinds of adjustment to increase the versatility of operation of the machine.

Figure 4 is a sectional view, somewhat enlarged of the operator housing as shown in Figure 3 and taken along line 4—4 in that figure.

Figure 5 is a diagrammatic view of a manually operated device for applying the metal coating.

Figure 6 is a sectional view of a typical coating rod feeding mechanism shown in Figure 5.

Figure 7 is an elevational view of an automatic machine for applying the metal coating over extensive base metal surfaces.

Figure 8 is an exemplary circuit which may be used for energizing in proper sequence the various motors shown in Figure 7.

Referring more particularly to Figure 1, reference character 1 designates a metal plate which may be constituted of a material such as iron or steel which is adapted to receive the usual form of metal coating. The principle employed in coating the plate 1 is to first heat the plate in any suitable manner and thereafter to apply the metal coat from a cold stick of coating material. The source of heat may be constituted of a gas flame 2, oxy-acetylene, acetylene, butane, etc., although if desired the necessary heat may be obtained electrically as for example, by means of a carbon arc. The gas head 2 is supported on any suitable form of carriage 3 which may form part of a machine (not shown) and in which suitable mechanism is provided for moving the carriage in the direction of the arrow 4. At the opposite end from the carriage of the gas head 2 there may be provided a tubular member 5 which extends transversely across the carriage and which receives a rod 6 of a low melting point alloy such as solder or any galvanizing material which contains zinc. In order to feed the alloy stick 6 continuously against the plate 1 a lugged tab 7 may be provided from which a tension spring 8 extends toward the carriage. It is apparent that as the carriage 3 is moved to the right heat from the gas head 2 is caused to impinge on the plate and to bring a localized area of the plate up to a temperature sufficiently high that when the rod or stick 6 is subsequently caused to pass over that area the rod will be melted to leave a coating on the plate. Thus the residual heat left in the plate after the gas head has moved thereover, causes the rod 6 to melt and to leave a metal coating of a thickness determined by the relative speed between the moving carriage 3 and the stationary plate 1.

Inasmuch as the distance between the carriage 3 and the plate 1 remains substantially constant, the coating is applied in a uniform manner and there are no limitations as to the size of the plate being treated other than the limitations of the carriage travel. The latter may be adapted to move in two directions by suitable and well known mechanism so that the rod 6 can be successively applied to all of the areas of the plate.

The principles of the invention as exemplified in Figure 1 can also be applied to a manually operated device as shown in Figures 5 and 6. Thus versatility of movement is obtained between the combined heating and coating device and the base metal plate 1. In these figures, numeral 9 designates a long hollow pipe which may be grasped at the lower end by the hand in order to guide the upper end in any desired manner over the part or parts to be coated. The pipe carries at its upper end a gas head 10 into which a gas or a gas mixture is supplied from the conduits. The control of the gas may be exercised at the hand valves 13, and the conduits 11, 12 preferably pass through the interior of the pipe 9 for protection and convenience. Directly below the valve head 10 there is an alloy feeding compartment 14 into which is inserted the coating rod 15. The latter bears against the metal plate 1. The details of the feeding mechanism are shown in Figure 6 and consist essentially of any suitable device which will urge the feeding rod 15 against the metal plate at a rate which is determined by the operator. As shown, the feeding compartment is completely enclosed except for a pair of aligned openings 16 at the ends, one of these openings being provided with a pair of oppositely positioned rollers for guiding the rod 15.

The opposite opening is provided with mechanism for applying friction to the rod 15. This mechanism may consist of a pair of hinged plates 18 forced together by a spring 19 and which plates bear against the surface of the rod. The latter is preferably moved in an "inching" manner by a lever 20 pivoted at 21 to a rod 22 and at its opposite end carries a pawl arm 23. The latter has a sharp edge to serve as a tooth for biting into the soft alloy 15 and is forced into this position by a tension spring 24. The lever 20 is adapted to rotate around an intermediate positioned pivot 25 and the arrangement is such that as a downward pull is exerted on the rod 22 the lever 20 is caused to swing clockwise and the pawl arm 23 will force the rod 15 to the right through any predetermined distance depending upon the amount of feed required. The pull on the rod 22 may be controlled by the operator through a suitable form of lever 26 which is secured to the pipe 9.

The entire apparatus may be made of light metal if desired so that an operator, by simply grasping the lower end of the pipe 9 and operating the lever 26, can cause any part of the metal plate 1 to be first subjected to the gas flame and immediately thereafter cause the end of the rod 15 to be presented to the heated area. Thus a bare spot left on a galvanized iron tank and which may have been caused while the tank was being shipped can be coated with a protective metal layer which will adhere to the surface of the tank quite as tenaciously as the original galvanize coating. Since there are no limitations as to the direction in which the pipe 9 can be wielded, bare spots in somewhat inaccessible positions can be readily treated in the manner described. It will be understood that while the devices described up to this point find considerable use in connection with re-galvanizing bare spots found on a galvanized plate, their use is not limited in this respect, but the devices may be readily employed for applying the original coating of galvanize metal or any other metal coating.

Figure 2 shows a power operated device somewhat similar to that of Figure 1 except that a power driven brush may be interposed between the heated position and the position of the coating rod 6. The brush is provided for the purpose of cleaning the metal surface while it is hot, to remove scale or other foreign material so that the rod 6 will be presented to a substantially clean metal surface rod to enhance its adhesion. The brush may be rotatably mounted on bearings 28 carried by the brackets 29. Mechanical power may be applied to the brush through a belt 30 driven by the same source of power as drives the carriage 3.

The operation of the device shown in Figure 2 is similar to that described with respect to Figure 1 except that the brush 27 is additionally used to clean and otherwise prepare the surface for the coating operation after the surface has been heated by the gas head.

Figure 3 illustrates a machine for successively heating, brushing and coating a metal surface and in which the various operating parts are provided with suitable movements and adjustments in order to accommodate the machine to any configuration and position that the foundation member may take. The machine is carried on a pedestal 31 which may be mounted on rollers 32 adapted to travel along tracks 33. The pedestal is hollow and is provided with an interior hub 34 in which is journalled the lower end of a vertically positioned screw 35. A bevel gear 36 is keyed to the screw and power is transmitted to this gear through a bevel pin 37, a horizontally disposed rod 38 and a handle 39. Directly above the horizontal pin there is a platform 40 preferably of a shape and size similar to the pedestal and provided with two or more vertical guide rods 41 which are adapted to enter openings (not shown) in the pedestal. The platform preferably has a U-shaped with thick webs 42 at each end and a thin inter-connecting web 43. The latter is provided with a centrally positioned bore 44 which is threaded to engage the threads of the rod 35. The arrangement is such that as the handle 39 is rotated the platform 40 is caused to move either upwardly or downwardly on the guide rods.

There is a pair of oppositely disposed grooves 45 extending longitudinally of the webs 42, these grooves being preferably of rectangular configuration. A number of rollers are disposed in these grooves and each group of rollers carries two or more inwardly extending rods on which is mounted a carriage 47. The latter is therefore adapted to move with respect to the platform 40 in a direction at right angles to the plane of the paper. This carriage may take a triangular shape and is provided at the top or apex end with a pair of furcations 48 between which a motor 49 is suspended. This motor may be carried on a suitably shaped strap (not shown) which is swively mounted at 50 and is adapted to be swung and secured in any arcuate position by means of a thumb screw 51 which moves along an arcuate slot 52. Thus by loosening the thumb screw and moving the same to any desired position in the slot, the position of the motor in the vertical plane may be adjusted.

The motor frame is provided with an upstanding extension 53 which terminates in a hollow cylinder 54 as shown in Figure 4. A relatively large rectangular housing or base 55 is secured to one end of the cylinder 54 and this housing slidably abuts a flanged portion 56 provided on the cylinder 54. There is a thick tubular member 57 contained within the cylinder 55, this member being adapted to be rotated with respect to the member 54. The outer end of the member 57 is provided with a collar 58 which is secured to the member as indicated at 59 and there is a lug or handle 60 secured to the collar. The housing 55 is secured to the member 57. Thus by moving the handle 60 in the vertical plane, it is possible to rotate the tubular member and the housing. This angular movement will usually be approximately 180° as will be explained hereinafter.

Within the housing 55 there is a coil 61 of the coating alloy, the free end of the coil being taken through friction rolls 62 one of which is adapted to be power driven through a worm 63. The worm shaft carries a pinion 64 which meshes with a gear 65 mounted on a shaft 66 which passes through the housing 55 and the tubular member 57. Suitable bearings (not shown) are provided for this purpose. One end of the shaft extends beyond the housing and carries a circular brush 67 which bears against the plate 68 to be coated. The rod 61 of the coating material similarly contacts with the workpiece 68. There is a gas or flame head 69 mounted on the housing 55 and positioned on the opposite side of the brush 67 from the coating material 61. Any suitable kind of gas or mixture of gases may be supplied to the gas head through the conduits 70. The shaft 66 is driven from the motor 49 through suitable pulleys and belting indicated at 71.

The workpiece 68 may constitute the longitudinal seam of a butt welded tank as indicated at 72 and assuming that the housing 55 has been brought into proper position by manipulating the elevating handle 39 and the wing nut 51, the housing may be moved along the seam parallel to the surface of the tank by manually sliding the carriage 47 with respect to the platform 40. The arrangement is such that local areas on the seam are first heated by the gas head 69 and the brush 67 immediately thereafter cleans the metal for the subsequent application of the coating by the rod material 61. The latter is continuously fed toward the work surface by the friction rollers 62 as it is being used up so that a protective coating of uniform thickness is spread over the areas which have been subjected to the coating rod. It has been found that when the coating rod and a gas flame are positioned at the proper distance from one another and with respect to the position of the brush 67, assuming also that proper temperature has been attained at the gas head 69, the resulting coating adheres so tenaciously to the foundation metal as to be inseparable therefrom except by a cutting or an abrasive action.

After the housing has been moved over the entire length of the seam in one direction the heating, brushing, and coating operations may be applied in the opposite direction by simply rotating the housing by the handle 60 which in effect reverses the position of the gas head 69 and the coating rod with respect to the workpiece.

It is evident that in view of the many adjustments that can be made in the position of the housing 55 in the various directions, the housing may be given practically any desired position with respect to the workpiece so that the heating, brushing and coating operations can be applied to positions which might be normally inaccessible from the standpoint of hand-operated tools. While I have described the use of the machine as pertaining to the application of a coating on a foundation metal, it is evident that the machine has ready adaptation to the repair of galvanized surfaces in which the galvanize coating may have been knocked off to leave bare spots which normally induce corrosion.

The machine shown in Figure 7 is quite similar to that illustrated in Figures 3 and 4 except that the operation by which the housing 55 is reversed at the end of its stroke, the elevation of the platform 40 and the carriage 47 is moved with respect to the platform 40 are all performed by power driven means. The housing 55 may be provided with a sprocket 73 (Figure 8) which is driven through a chain 74 from a small sprocket 75 mounted on the motor 76. The latter may be secured conveniently to a web 77 which joins the cylinder 54 to the motor 49. A motor 78 may be provided to elevate the platform 40 through suitable gear mechanism 79 and a shaft 80 which connects with the bevel gear 37 shown in Figure 3. A motor 81 may be carried on the web 43 of the platform 40, the motor being provided with a gear 82 which meshes with a rack 83 secured to the carriage 47. Thus when power is applied to the motor 81 the carriage is caused to move in a direction at right angles to the plane of the drawing.

A suitable circuit for automatically controlling the motors 76, 78, 81 and the motor 49 which operates the brush 67 is depicted in Figure 8. The main supply lines are indicated at 84 and the various switches and circuits are connected to these lines. The switch causing a 180° reversal of the housing 55 is designated generally at 85. This switch may be constituted by an arm 86 pivoted at 87 and spring biased in a neutral position by tension springs 88. The lower end of the arm 86 preferably carries a roller 89 which is adapted to be struck by a hammer 90 mounted on a lever 91 and pivoted at 92. The lever is connected to the sprocket wheel 73, the arrangement being such that as the wheel is rotated in the counterclockwise direction the lower end of the arm 86 is moved to the left but when the wheel 73 is rotated in a clockwise direction (through approximately 360°) the lower end of the arm 86 is moved to the right. Stops 93 may be provided to limit the movement of the arm. At a position intermediate the pivot 87 and the roller 85, the arm 86 is provided with oppositely positioned contact points 94 which are adapted selectively to strike the terminal contacts 95.

The switching mechanism for controlling the reversal of the motor 81 at each end of the stroke of the moving carriage 47 is generally designated by the reference character 96. At each end of the rack 83 there is a pair of oppositely positioned switches, the component contacts of which are designated 97, 98, 99, 100, 101, 102, 103 and 104 respectively. The switch contacts 98, 100, 101 and 103 are preferably movable and are spring biased by the springs 105. The remaining contacts 97, 99, 102 and 104 are stationary, the arrangement being such that as the rack 83 is moved to the left, the left hand pair of switches is closed whereas when the rack is moved to the right the right hand pair is similarly closed.

As shown the motors 76 and 81 are of the reversible type in which three terminals are brought out from each motor to indicate this reversibility. The terminals of motor 76 are designated 106, 107, 108 respectively while the terminals of the motor 81 are designated 109, 110, 111 respectively. A conductor 112 is taken from the supply mains 84 to the pivot 87 and a conductor 113 connects the supply mains with the terminal 108 of the motor 76. A wire 114 connects the switch contact 95 with the terminal 110 of the motor 81 and a companion conductor 115 connects the other switch terminal 95 to the terminal 109 of the same motor. The remaining terminal 111 of motor 81 is electrically connected to the mains through conductor 116. The terminal 106 of the motor 76 connected through wire 117 with the contact 97 while the contacts 99 and 104 are connected together through conductor 118 and also to one side of the motor 78. The other side of this motor is connected through wire 119 to the mains. The movable switch contacts 98 and 100, also the switch contacts 101 and 103 are all connected together and to the mains through a wire 120. The intermediate terminal 107 of the motor 76 is electrically connected through the conductor 121 to the terminal 102.

Conductors 122 electrically connect the motor 49 to the supply mains. Assuming that the switch 123 is closed and the switch 85 is in the position illustrated, it is apparent that a circuit is established from the mains through conductor 112, contact 95, conductor 115 through motor 81 and through conductor 116 back to the mains. Thus the motor 81 will be energized and will cause a movement of the carriage 47. Let us assume that the carriage is moved to the left as viewed in Figure 8 so that the rack 83 causes a closure of the contacts 97, 98 and 99, 100. A circuit is established through conductor 113, motor 76, conductor 117 through the upper switch contacts 97, 98 and conductor 120 to the other side of the line. Thus motor 76 is energized. The latter will rotate the sprocket wheel 73 and cause the hammer 90 to move through 360° so that the hammer will strike the roller 89 from the opposite side from that shown and will move the lower end of the arm 86 to the right. Under these circumstances a circuit is established through conductor 112, arm 86, conductor 114, to the terminal 110 of the motor 81, then through the motor to the conductor 116 to the mains. The motor 81 will therefore be caused to operate in a direction opposite to its original direction.

Assuming that the motor 81 had previously moved the rack 83 to the left, the contacts 99, 100 were also closed which completed a circuit to the motor 78 through the conductors 119 and 120. It will also be noted that when the rack 83 is moved to the right upon reversal of the motor 81 contact is established between 103 and 104 to energize the motor 78 in the same direction as before. From the foregoing description it is apparent that the motor 76 is operated intermittently and only at the time when the rack 83 will have been at one end or the other of its stroke. Thus the housing 55 is reversed in position at each end of the travel of the carriage 47. It is also apparent that the motor 81 which controls the movement of the carriage 47 is reversed in response to the reversal of the switch 85 and which in turn is controlled by the reversing operation of the motor 76. The general arrangement is such that the housing 55 which carries the gas head, brush, and coating material is moved continuously in a longitudinal direction until a band of the coating material has been laid down after which the motor 78 is operated for a short time in order to give the housing 55 a movement at right angles to its previous movement and at the same time the housing is rotated through 180° ready for a return trip over the work piece but displaced in position a distance corresponding to the width of the band which had been previously coated during the immediate preceding excursion of the housing over the work piece. Thus the movement of the housing over the plate 68 may be aptly described as taking a zigzag course consisting of horizontal paths joined at opposite ends by a vertical path in order to present fresh surfaces to the combined action of the gas head, brush and coating rod.

The operation is entirely automatic in that the housing 55 will make its various excursions over the surface of the plate 68 until the entire width and length of the plate has been coated with the material 61 (Figure 4).

It is evident that there is no limit as to the width of surface over which the housing 55 is caused to move because the motor 78 which controls the movement of the housing in the transverse direction in counterdistinction to the longitudinal direction of movement of the carriage 47 will continue to operate at each end of the stroke of the carriage as long as the carriage motor 81 operates. The length of the foundation member which may be coated in the manner described is also practically without limit since it depends merely upon the length of the travel of the carriage 47 and this length may be made as long as is necessary.

It will be understood that I desire to comprehend within my invention such modifications as come within the scope of the claims and the invention.

Having thus fully described my invention of what I claim is new and desire to secure by Letters Patent, is:

1. Apparatus for applying a coating to a workpiece, said apparatus comprising a head, means mounted on said head for applying heat to said work, and for supporting coating material in stick form whereby said stick follows in the path of said heat applying means, means mounting said head for rotation about an axis, means for moving said head in one direction over the workpiece in order successively to heat and coat an area on the workpiece, and means for rotating said head through 180° at the end of its travel in said one direction in order to reverse the position of the heat source and coating material with respect to one another for a return movement over the workpiece.

2. Apparatus for applying a metal coating to a metal workpiece, said apparatus comprising a base, a gas flame head on said base, means on said base adapted to hold and present to said workpiece a stick of coating metal, means for moving said base over the workpiece in one direction along a fixed path and means automatically operated when said head reaches an end of said path for moving the base at right angles to the first direction and simultaneously reversing the position of the said head and stick and for reversing the direction of operation of said moving means to move the base in its reversed position over the workpiece in a direction opposite to the first direction whereby an extended area on the workpiece is successively presented first to the gas flame and then to the coating material.

3. Apparatus for applying a coating to a workpiece, said apparatus comprising a base, a gas flame head on said base to locally heat said workpiece, means on said base to hold and present to said workpiece a body of coating material, means for moving said base along and adjacent the workpiece in one direction in a definite path to present successive areas of said workpiece first to the gas flame and then to the coating material, means for automatically moving said head in a direction at right angles to the first direction when the head has reached the end of its path and means simultaneously moving said base through approximately 180° in order to reverse the positions of the flame head and coating material with respect to one another, said base being then in a position to move in a direction opposite to the first direction but at a distance removed therefrom, said apparatus being adapted to carry out the heating and coating excursions of said base until all adjacent areas of the workpiece have been presented first to the gas flame head and then to the coating material.

4. Apparatus for applying a coating to a workpiece, said apparatus comprising a gas flame head and means supporting a body of coating material in solid form, a common base carrying said head and supporting means a predetermined distance apart, motor means for moving said base first in one direction along a definite path over the workpiece and then in the opposite direction in a path spaced from and parallel to said first path and motor means for reversing the position of said base at each end of its travel in order to assure that the flame head precedes the coating material during the movement of the workpiece and an electric circuit for supplying energy to all of said motor means in the proper sequence so as to cause said base to move successively over adjacent areas throughout the entire surface of the workpiece.

5. In a device for coating surfaces, a carriage, a heating mechanism on said carriage adapted to locally heat a surface as the carriage is moved therealong, means positioned on said carriage to follow in the path of said heating mechanism at a predetermined distance as said carriage is moved said means including means adapted to yieldingly feed a strip of solid coating material into contact with said surface, a brush rotatably mounted between said heating mechanism and the point of contact with said surface of said material and means for rotating said brush in contact with said surface and simultaneously feeding said material into coating relation with said surface.

6. Apparatus for applying a coating to a workpiece, said apparatus comprising a base, means on said base for applying heat to said workpiece, means on said base for receiving and moving a body of coating material into contact with said workpiece, means mounting said base for universal movement to thus present any portion of said workpiece first to the heat applying means and then to the coating material.

7. In a machine for coating surfaces, a pedestal, a platform carried by said pedestal for rectilinear adjustment relatively thereto, first power means for so adjusting said platform, said platform having guide means conforming to a path predetermined in shape and length, a carriage mounted for movement on said platform under control of said guide means, a head revolubly mounted on said carriage, heating means on said head for applying heat to local areas of said surfaces as said pedestal is moved therealong, means on said head for holding a body of coating material and feeding the same toward the areas previously heated by said heating means, second power means for moving said carriage along said path, third power means for revolving said head through substantially 180°, means operated by said carriage at the end of its path reversing said second power means, operating said third power means to so revolve said head, and operating said first power means a predetermined amount only.

HARRY A. TOULMIN, Jr.

REFERENCES CITED

The following references are of record in the file of this patent:

UNITED STATES PATENTS

| Number | Name | Date |
| --- | --- | --- |
| 1,244,931 | Wehrle | Oct. 30, 1917 |
| 1,570,949 | Cunningham | Jan. 26, 1926 |
| 2,288,869 | Wassermann | July 7, 1942 |
| 2,277,654 | Sobel | Mar. 24, 1942 |
| 1,902,770 | Fiegel | Mar. 21, 1933 |
| 2,295,701 | Wagner | Sept. 15, 1942 |
| 2,295,702 | Wissler | Sept. 15, 1942 |

FOREIGN PATENTS

| Number | Country | Date |
| --- | --- | --- |
| 481,683 | Great Britain | Mar. 16, 1938 |